Feb. 1, 1927.    1,616,386

F. J. O'STROSKE

VALVE

Filed Dec. 21, 1925

Inventor
FRANK J. O'STROSKE

By
Attorney

Patented Feb. 1, 1927.

1,616,386

UNITED STATES PATENT OFFICE.

FRANK J. O'STROSKE, OF COLUMBUS, OHIO.

VALVE.

Application filed December 21, 1925. Serial No. 76,817.

This invention relates to valves, and more particularly to manually operated valves.

An object of the invention is to provide a valve consisting of a casing having diametrically opposed inlet and outlet openings, a ball shaped valve member having an opening or port centrally arranged, and means to permit the valve member to automatically adjust itself to take up wear.

A further object of the invention is the provision of a ball valve of this type in which the handle and pivot member may each be secured to either side, thus permitting the valve to be reversed.

A further object is to provide a construction of this character having a broad packing ring on one side and two narrow rings on the other side, thus reducing wear on the ball valve member.

A further object is the provision of a ball valve having recesses formed in its face between the ends of the ports and alined with the openings in the casing when the valve is in closed position, said recesses being adapted to removably receive caps having concaved faces.

In the accompanying drawings, I have shown one embodiment of the invention. In this showing:

Figure 1:
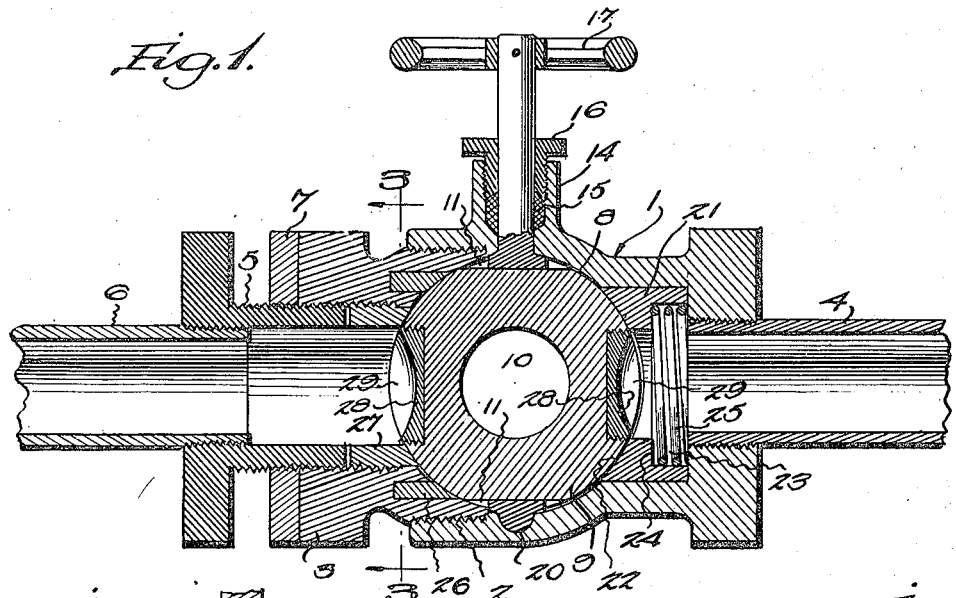
Figure 1 is a central vertical sectional view.
Figure 2:
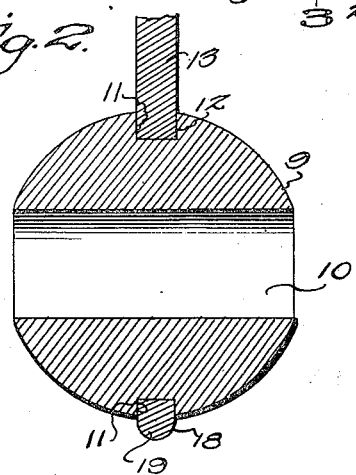
Figure 2 is a vertical sectional view through the valve member at right angles to Figure 1.
Figure 3:
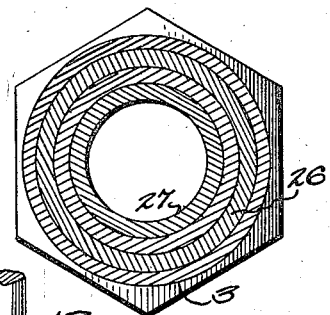
Figure 3 is a transverse vertical sectional view on line 3—3 of Figure 1.
Figure 5:
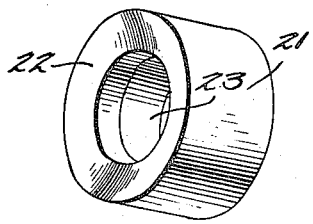
Figure 4:
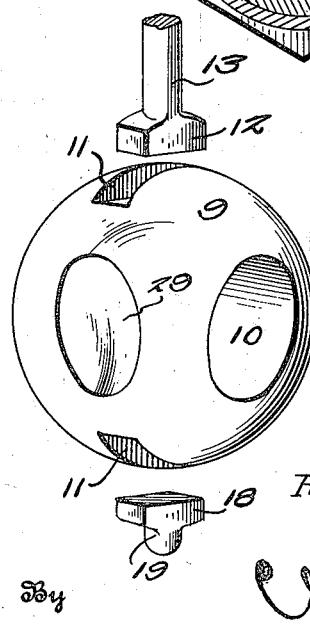
Figure 4 is a detail view of the valve member removed and, Figure 5 is a perspective view of one of the packing rings.

Referring to the drawings, the reference numeral 1 designates a section of the valve casing which is internally threaded, as at 2, to receive external threads formed on a complementary section 3 of the valve casing. The section 1 is provided with a threaded opening for the reception of the end of an inlet pipe 4, and the section 3 is likewise provided with a threaded opening adapted to receive a bushing 5 which in turn receives an outlet pipe 6. The bushing is retained in position by means of a lock nut 7. Within the valve casing, there is provided a spherical valve seat 8 adapted to receive a ball valve 9. As shown, the ball valve is provided with a diametrically extending port or passage 10 which connects the inlet and outlet openings when in one position and disconnects them when in the position shown in Figure 1 of the drawings. At the top and bottom of the valve member, I provide slots 11. One of these slots is adapted to receive a substantially T-shaped head 12 formed on an operating handle 13. As shown, the operating handle projects upwardly through the packing gland 14 formed on the valve section 1 and is surrounded by suitable packing 15. A bushing 16 is arranged within the packing gland in the usual manner. The projecting portion of the support 13 is provided with a suitable operating handle or wheel 17.

The other slot is adapted to receive a substantially T-shaped head 18 carried by a pivot member 19. This pivot member is received in a socket 20 in the bottom of the valve casing to pivotally support the valve member. It will be apparent that the arrangement of the slots 11 with respect to the port 10 is such that the operating handle and the pivot member may each be arranged in either of the slots, thus permitting the valve to be reversed.

Within the inlet section of the valve casing, I provide a packing ring 21 having its face curved on a radius from the center of the ball valve, as at 22, to engage the face of the ball valve. The packing ring is provided with a central opening 23 in alinement with the inlet pipe and the outer end of this opening is enlarged forming a shoulder 24. A coil spring 25 is arranged between this shoulder and the adjacent wall of the valve casing to force the packing ring toward the ball valve.

On the opposite side of the valve, the casing section 3 is provided with a groove for the reception of a packing ring 26 and the second packing ring 27 is arranged within the central bore of this section of the casing and is forced inwardly against the ball valve by the bushing 5.

At points intermediate the ends of the opening 10, I provide recesses adapted to receive threaded plugs 28 and these plugs are provided with concaved outer faces 29 which are arranged in alinement with the ends of the inlet and outlet pipes when the valve is in closed position.

The operation of the device will be apparent from the foregoing description. With the valve in the position shown in Figure 1 of the drawings, it may be opened by turning the operating wheel 17 through a quarter of a circle. In operation, the valve turns on the member 19 as a pivot. It will be apparent that the valve is self-centering and may automatically adjust itself under the pressure of the fluid to take up wear. When the valve is in closed position, the slots 11 extend longitudinally of the line of flow and the pressure on one face of the valve will tend to move it with the heads 12 and 18 riding longitudinally of the slots 11 until it engages the adjacent face of the valve casing on the outlet side. The packing ring 21 will also automatically adjust itself due to the spring 25.

The conical recesses formed by the face of the plugs 29 also causes the valve to be self-centering as the pressure of the fluid is exerted in all directions from the center when the fluid is in contact with the face 29.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. In a device of the character described, a valve casing having a spherical valve seat, a ball valve mounted therein and having a transverse port, said valve being provided with slots at the top and bottom at right angles to said port, a handle having an enlargement adapted to be received in one of said slots, and a pivot member adapted to be received in the other slot, the casing being provided with a socket for the reception of said pivot member.

2. In a device of the character described, a valve casing having a spherical valve seat, a ball valve mounted therein and having a transverse port, said valve being provided with slots at the top and bottom at right angles to said port, a handle arranged over said valve, said handle being provided with a T-shaped head adapted to be received in one of said slots, the bottom of said casing being provided with a socket, and a pivot member mounted in said socket, said pivot member being provided with a T-shaped head adapted to be received in the other slot.

3. In a device of the character described, a valve casing, said casing being provided with a valve seat, a ball valve mounted on said seat, said valve being provided with a diametrically extending port, and being further provided with recesses in its outer face arranged intermediate the ends of said port, and removable concaved faced plugs mounted in said recesses.

4. In a device of the character described, a valve casing having an inlet opening and an outlet opening, said casing being provided with a spherical valve seat, a ball valve mounted therein and having a transverse port, said valve being provided with slots at the top and bottom arranged longitudinally of the casing when the valve is in closed position, a handle arranged above said valve, the lower end of said handle being received in the upper slot, the bottom of said casing being provided with a socket, a pivot member arranged in the lower slot and extending into said socket, a packing ring arranged in said casing on the inlet side of said valve, and a spring arranged between said ring and said casing.

5. In a device of the character described, a valve casing having a spherical valve seat, a ball valve mounted therein and having a transverse port, said valve being provided with slots at the top and bottom at right angles to said port, an operating member adapted to engage one of the slots, and a pivot member adapted to engage the other slot, said members being arranged to permit the valve to be reversed in the casing.

6. In a device of the character described, a valve casing having a spherical valve seat, a self-centering and automatically adjusting ball valve mounted therein and having a transverse port, said valve being provided with slots at the top and bottom, an operating member adapted to engage one of the slots, a pivot member adapted to engage the other slot, said members being arranged to permit the valve to be reversed in the casing, a packing ring arranged on the inlet side of said valve, and a packing ring arranged on the outlet side of said valve, the last mentioned ring being demountable while the valve is under fluid pressure.

In testimony whereof, I affix my signature.

FRANK J. O'STROSKE.